United States Patent
Gunther et al.

(10) Patent No.: US 10,040,222 B2
(45) Date of Patent: *Aug. 7, 2018

(54) COLLAPSIBLE, COILED MANDREL

(71) Applicant: The Boeing Company, Chicago, IL (US)

(72) Inventors: Steven M. Gunther, O'Fallon, IL (US); Steven J. Burpo, St. Louis, MO (US)

(73) Assignee: The Boeing Company, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/641,416

(22) Filed: Jul. 5, 2017

(65) Prior Publication Data

US 2017/0297231 A1    Oct. 19, 2017

Related U.S. Application Data

(62) Division of application No. 14/322,972, filed on Jul. 3, 2014, now Pat. No. 9,724,848.

(51) Int. Cl.
| | |
|---|---|
| *B29C 33/48* | (2006.01) |
| *B29C 70/30* | (2006.01) |
| *B29C 33/30* | (2006.01) |

(52) U.S. Cl.
CPC .......... *B29C 33/485* (2013.01); *B29C 70/30* (2013.01); *B29C 33/307* (2013.01); *Y02T 50/43* (2013.01)

(58) Field of Classification Search
CPC ..... B29C 33/485; B29C 70/30; B29C 33/307; Y02T 50/433
See application file for complete search history.

(56) References Cited

U.S. PATENT DOCUMENTS

| | | | |
|---|---|---|---|
| 5,766,204 A | 6/1998 | Porter et al. | |
| 5,827,598 A | 10/1998 | Larsen et al. | |
| 7,100,346 B2 | 9/2006 | Kotzur | |
| 7,897,004 B2 | 3/2011 | Engwall | |
| 8,691,037 B2 | 4/2014 | Ingram | |
| 8,714,485 B2 | 5/2014 | Matheson | |
| 9,724,848 B2 * | 8/2017 | Gunther | B29C 33/485 |

FOREIGN PATENT DOCUMENTS

| | | |
|---|---|---|
| CN | 101484290 A | 7/2009 |
| CN | 101932506 A | 12/2010 |
| CN | 102223989 A | 10/2011 |
| CN | 102458790 A | 5/2012 |

OTHER PUBLICATIONS

First Notification of Office Action dated May 4, 2018 in corresponding Chinese Patent Application No. 201510203137.1.

* cited by examiner

*Primary Examiner* — Robert J Grun
(74) *Attorney, Agent, or Firm* — Ostrager Chong Flaherty & Broitman PC

(57) ABSTRACT

A collapsible, coiled mandrel, for use in co-curing of a hollow carbon-epoxy structure such as a stringer in aircraft construction, is made of a coil having an outer coil shape resistant to external compression forces when used as a mandrel during lay-up and curing, and is collapsible when an end of the coil is pulled along its longitudinal axis so that it can be easily removed after curing and discarded.

20 Claims, 6 Drawing Sheets and epoxy matrix. Other materials may be used singularly or in combination to fabricate the grooved facesheet 10, and other materials may be combined with composites. The materials or combination of materials have a resultant coefficient of thermal expansion $CTE_{hoop}$ of the facesheet (indicated by the double headed arrow in FIG. 1).

COLLAPSIBLE, COILED MANDREL

RELATED PATENT APPLICATION

This application is a divisional of and claims priority from U.S. patent application Ser. No. 14/322,972 filed on Jul. 3, 2014.

TECHNICAL FIELD

This disclosure generally relates to removable mandrels for use in fabricating co-cured carbon-epoxy structures, and, more particularly, to collapsible, coiled mandrels that facilitate reducing or eliminating buckling of an outer laminate layer of a carbon-epoxy structure during lay-up, and that can be removed easily and cleanly after co-curing of the carbon-epoxy structure.

BACKGROUND

Carbon-epoxy structures comprise a plurality of carbon fibers embedded in a matrix of resin (typically epoxy) to support and bond the carbon fibers together, and may be provided as pre-impregnated or "prepreg" structures.

Carbon-epoxy structures are strong and light weight, and therefore are used in a wide range of industries either by themselves or co-cured to other carbon-epoxy structures. For example, in the aircraft industry, aircraft wings comprise co-cured carbon-epoxy structures to provide the wings with sufficient strength to handle aerodynamic loads imposed on the wings during flight and sufficiently low weight to accommodate aircraft requirements. Aircraft wings and other aircraft structures are typically formed with arrays of stiffeners or "stringers" co-cured with an outer laminate layer (such as the aircraft skin). Stringers may be fabricated as a prepreg in various cross-sections, such as I-beam, Z, or "hat-shaped" cross-sections. A "hat-shaped stringer" is generally formed by a pair of webs that extend upwardly from a base portion and are connected in a hat shape enclosing a hat-shaped cross-sectional volume.

A lay-up method is typically used to co-cure stringers with the aircraft skin. The aircraft skin, also formed as a prepreg, is laid-up onto the stringer to cover the hat-shaped cross-sectional volume and form a hollow inner volume. Sufficient heat and pressure are applied by autoclave or similar method to co-cure the stringers and the aircraft skin together. A removable mandrel is commonly inserted into the hollow inner volume to support the hollow inner volume during curing. The stringers provide stiffener resistance to loads applied on the aircraft skin, while the hollow inner volume of the stringer provides a light weight in relation to its stiffener strength. The foregoing process may be used for co-curing any type of carbon-epoxy structures, for example, co-curing an aircraft skin to ribs, beams, and other aircraft structural components without compromising the aircraft skin.

An example of a conventional apparatus and method for forming a hollow hat-shaped stringer for aircraft construction and co-curing the stringer to an aircraft skin with an inner removable mandrel for support is illustrated in FIGS. 1-4. As illustrated in FIG. 1, a grooved facesheet 10 has a plurality of grooves 12 spaced at angular intervals and extending in a generally lengthwise or longitudinal direction L. In this example, the grooves 12 have a generally trapezoidal hat-shaped cross-section with corners that curve smoothly and make a radiused transition to a bottom plane 14. Other groove cross-sectional shapes are also possible, such as the semi-circular groove or a V-shaped groove to name a few. The grooved facesheet 10 may be made of a composite material such as carbon fibers or fabric in an epoxy matrix. Other materials may be used singularly or in combination to fabricate the grooved facesheet 10, and other materials may be combined with composites. The materials or combination of materials have a resultant coefficient of thermal expansion $CTE_{hoop}$ of the facesheet (indicated by the double headed arrow in FIG. 1).

FIGS. 2-4 are cross-sectional end views illustrating various stages of a conventional method for forming a stringer 16 co-cured to an aircraft skin using the grooved facesheet 10 of the type shown in FIG. 1. The stringer 16 has a cross-section with a trapezoidal hat-shape having side walls 18 and end flange portions 20*a*, 20*b*. Referring to FIG. 2, the stringer 16 is positioned in one of the hat-shaped grooves 12 formed in the grooved facesheet 10. The side walls 18 of the stringer 16 have interior surfaces 22 which define a hollow inner volume 24 within the hat-shaped stringer 16. A rigid, hat-shaped mandrel 26 is positioned within the hollow inner volume 24 of the stringer 16 so that outer surfaces 28 of the hat-shaped mandrel 26 are in supporting contact with the interior surfaces 22 of the stringer 16 to maintain the shape of the stringer 16 under compressive forces applied during lay-up and curing.

Referring to FIG. 3, once the mandrel 26 is positioned inside the side walls 18 forming the hollow inner volume 24 of the stringer 16, an outer substrate layer 30 is laminated over the facesheet 10, stringer end flange portions 20*a*, 20*b*, and mandrel 26 to form an aircraft skin. Like the stringer 16, the outer substrate layer 30 may be a prepreg carbon-epoxy structure. The outer substrate layer 30 is co-cured with the stringer 16 by applying sufficient heat and pressure in autoclaving or a similar method. The outer substrate layer 30 becomes bonded by co-curing to the flange portions 20*a*, 20*b* of the stringer 16 and the outer surface 28 of the mandrel 26.

Referring to FIG. 4, curing may be performed by first positioning a compressible pad or caul sheet 32 over the outer substrate layer 30, and a vacuum bag 34 is positioned over the caul sheet 32 and the outer substrate layer 30 in order to form a pressurized environment for autoclaving. The air space between the vacuum bag 34 and the outer substrate layer 30 is then evacuated to apply an even pressure against the outer substrate layer 30, end flange portions 20*a*, 20*b* of the stringer 16, and outer surface 28 of the mandrel 26. The outer substrate layer 30 is then co-cured to the grooved facesheet 10, the end flange portions 20*a*, 20*b* of the stringer 16, and the outer surface 28 of the mandrel 26 at a curing temperature using an autoclave while under vacuum. After curing, the outer substrate layer 30 is separated from the caul sheet 32 and the vacuum bag 34, and the mandrel 26 in the hollow inner volume 24 of the stringer 16 is removed. The outer surface 28 of the mandrel 26 may be made of a material or treated with a material that releases from the interior surfaces 22 of the stringer 16 following curing to permit removal of the mandrel 26.

Any of a variety of mandrels may be used in co-curing of co-cured carbon epoxy structures having a hollow interior volume. For example, there is a hard rubber type of mandrel that may be inserted in the cross-sectional volume of a stringer, but this type of mandrel has proved to be difficult to remove from the stringers after curing. There is also an expendable type of mandrel that may be dissolved after curing, but this type of mandrel requires a messy and impractical dissolution process. Another type is a re-usable elastomeric mandrel system (REMS), which is essentially a rubber mandrel full of ceramic beads. However, the REMS type of mandrel may be impractical to use with longer stringer lengths.

A type of mandrel commonly used is a pressurizable flexible bladder that provides an equal and opposite expansion force so as not to collapse during cure pressures of up to about 100 psi. However, the bladder type of mandrel is not pressurized during lay-up or emplacement, which may allow an outer laminate layer to buckle and cause numerous problems in subsequent operations. Moreover, a bladder type of mandrel may be inconvenient to use because it can cause wrinkles in the outer laminate layer, can have potential leaks which must be checked on every run, must be inserted and removed on every run, and/or replaced at a high cost.

It would therefore be desirable to provide an improved type of mandrel for use in co-curing of hollow carbon-epoxy structures that can reduce or eliminate buckling of an outer laminate layer during lay-up, and that can be removed easily and cleanly after co-curing of the carbon-epoxy structures.

SUMMARY

In accordance with a preferred embodiment in the present disclosure, a collapsible, coiled mandrel for use in co-curing of a hollow carbon-epoxy structure is provided. The collapsible, coiled mandrel is made of a fiber wetted by a doping material that provides the fiber with a property of stiffness when dried. The fiber wetted with doping material is formed with coil turns extending along a longitudinal axis and maintaining an outer coil shape when dried that is resistant to external compression forces when used as a mandrel during a subsequent lay-up and curing of a hollow carbon-epoxy structure. The collapsible, coiled mandrel is collapsible axially by shear forces applied when an end of the fiber wetted with doping material is pulled in a direction along the longitudinal axis so that the collapsible coiled mandrel can be easily removed from the hollow carbon-epoxy structure after curing and discarded.

The collapsible, coiled mandrel is contained within a protective liner. The protective liner provides a protective boundary to prevent resin during co-curing from fusing into the coiled mandrel. A preferred fiber used to form the collapsible, coiled mandrel may be a natural or synthetic fiber that is sufficiently porous to absorb fluid doping material and capable of drying with a property of stiffness so as to be resistant to compressive forces during lay-up and co-curing. Preferred fibers have a tensile strength greater than a bond strength of the doping material when dried. A preferred doping material may be ceramic powder suspended in aqueous fluid. In a preferred use, the collapsible, coiled mandrel is formed with a coil shape, size and coil density suitable for use as a mandrel for forming a stringer in aircraft construction. The collapsible, coiled mandrel may have a trapezoidal or hat-shaped cross-section for use in forming a hat-shaped stringer.

A method of fabricating a collapsible, coiled mandrel is also provided. In the method, a mold is provided having upper and lower mold halves extending along a longitudinal axis and having complementarily-shaped half-recesses facing each other and together forming combined mold recesses of the mold. An applicator is inserted through an open end of the combined mold recesses of the mold for feeding a fiber wetted with a doping material that provides a property of stiffness to the fiber when dried. The fiber wetted with the doping material is extruded from an output end of the applicator for forming a coil with coil turns filled into the combined mold recesses of the mold by rotating the applicator while backing the applicator out of the combined mold recesses of the mold. The fiber wetted with doping material is dried in the combined mold recesses of the mold so that the resultant coil has a property of stiffness to be resistant to compressive forces during a subsequent lay-up and curing when used as a mandrel for forming a hollow carbon-epoxy structure, and is collapsible axially by shear forces applied when an end of the coil is pulled in a direction along the longitudinal axis so that it can be easily removed from the hollow carbon-epoxy structure after curing and discarded.

In an alternative embodiment, a collapsible, coiled mandrel may be formed of a metal coil having coil turns extending along a longitudinal axis and maintaining an outer coil shape that is resistant to external compression forces during a subsequent lay-up and curing of a hollow carbon-epoxy structure, said collapsible, coiled mandrel being collapsible axially by shear forces applied when an end of the metal coil is pulled in a direction along the longitudinal axis so that it can be easily removed from the hollow carbon-epoxy structure after curing and discarded, and a protective liner sleeved over the metal coil made of a material that allows the collapsible, coiled mandrel to release from interior surfaces of the hollow carbon-epoxy structure after curing. An example of a metal that may be used is steel wire. The metal coil can be made in any of a variety of mandrel shapes.

Other objects, features, and advantages of the various embodiments in the present disclosure will be explained in the following detailed description with reference to the appended drawings.

DETAILED DESCRIPTION

In the following detailed description, certain preferred embodiments are described to illustrate the principles in the present disclosure for fabrication of a collapsible, coiled mandrel 40 (shown in FIGS. 5 and 6) and use of the collapsible, coiled mandrel 40 for co-curing a hollow carbon-epoxy structure in accordance with co-curing methods of the type described in the background section.

In a preferred environment of use, the collapsible, coiled mandrel 40 may be used to form a stringer co-cured with an aircraft skin. However, it will be recognized by one skilled in the art that principles in the present disclosure may be practiced in other analogous applications or environments and/or with other analogous or equivalent variations of the illustrative embodiments. It should also be noted that those methods, procedures, components, or functions that are commonly known to persons of ordinary skill in the field of the invention are not described in detail so as avoid unnecessarily obscuring a concise description of the preferred embodiments.

Figure 1:
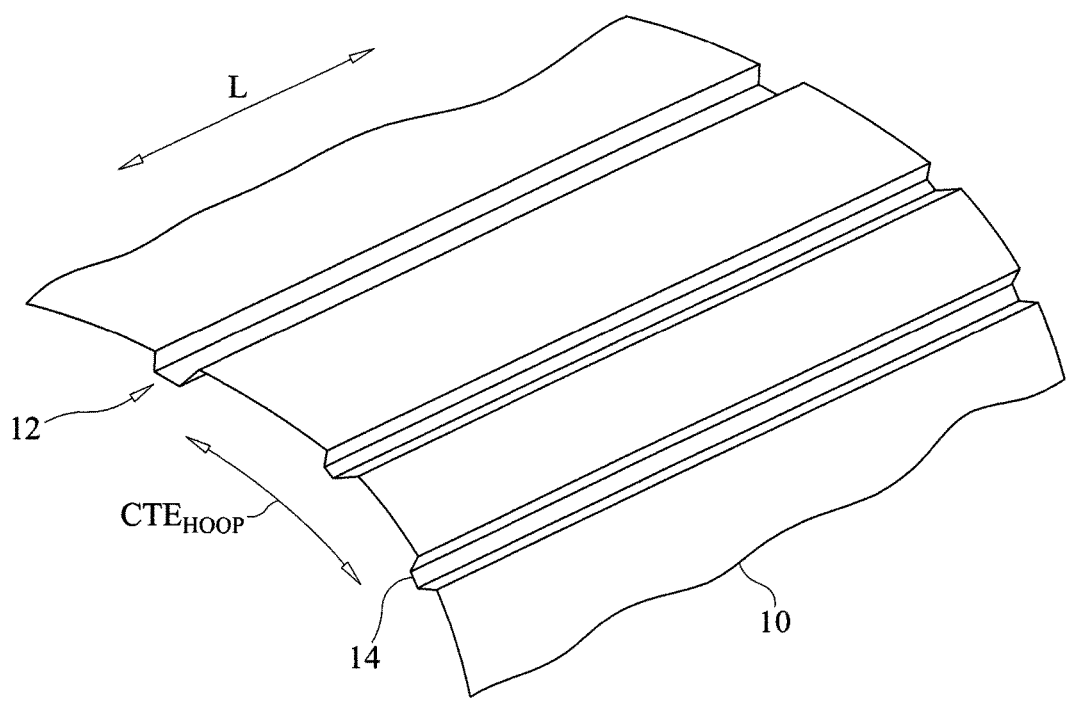
FIG. 1 illustrates a conventional grooved facesheet for forming an aircraft skin with stringers.
Figure 2:
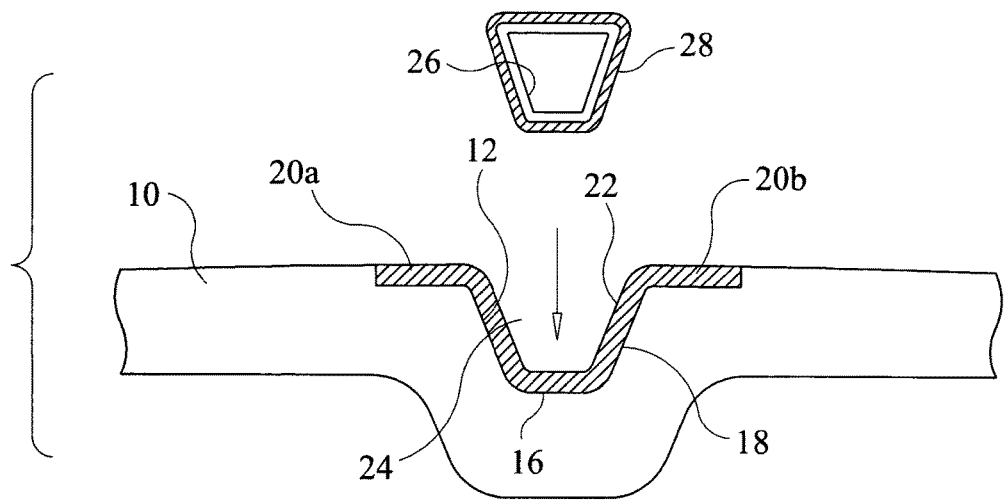
FIGS. 2-4 are cross-sectional end views illustrating various stages of a conventional method for forming an aircraft skin with stringers using the grooved facesheet shown in FIG. 1.
Figure 3:
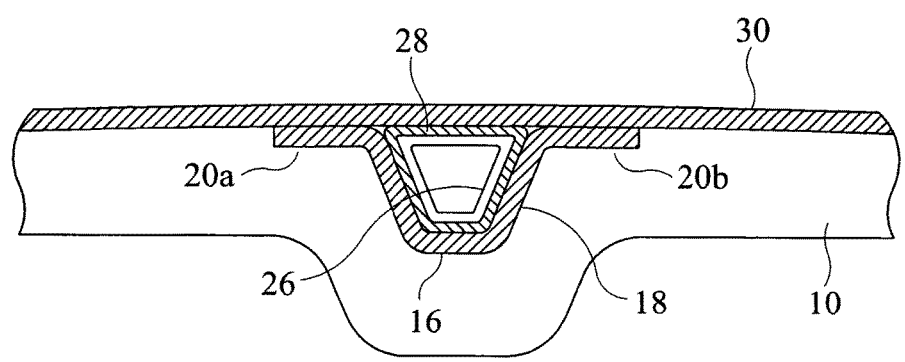
Figure 4:
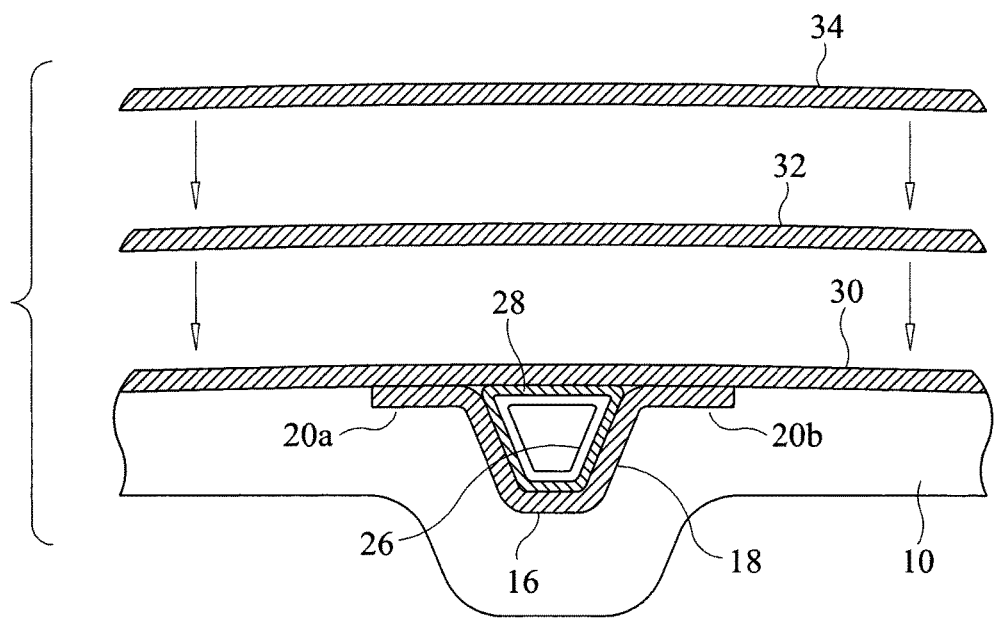
Figure 5:
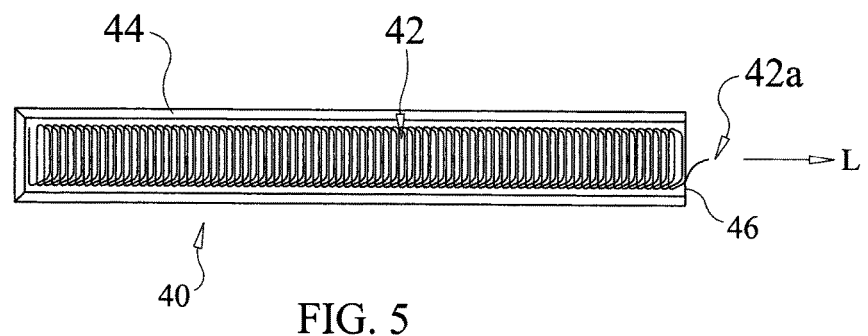
FIG. 5 shows a cross-sectional view of the collapsible, coiled mandrel.

Referring to FIG. 5, the collapsible, coiled mandrel 40 comprises a doping stiffened fiber coil 42 sleeved into a protective liner 44. A terminal end 42*a* of the doping stiffened fiber coil 42 is exposed from an open end 46 of the protective liner 44 to permit pulling the terminal end 42*a* in an axial direction along the longitudinal axis L to collapse the doping stiffened fiber coil 42 and easily remove it from a carbon-epoxy structure after curing.

In a preferred embodiment, the doping stiffened fiber coil 42 is formed from a natural or synthetic fiber 48 that is wetted with a fluid doping material 49 (as shown, for example in FIG. 7B, described below). The fiber 48 should be sufficiently porous to absorb the doping material 49 and be capable of drying with a property of stiffness to facilitate forming the doping stiffened fiber coil 42 and to be resistant to compressive forces during lay-up and co-curing. The fiber 48 preferably has a tensile strength that is greater than the bond strength of the dried doping material 49 so that the terminal end 42*a* of the doping stiffened fiber coil 42 can be pulled in an axial direction to break the bonds of the dried doping material 49 without breaking the fiber 48.

A preferred doping material 49 is ceramic powder suspended in aqueous fluid. An example is C-Aquapor commercially available from Aero Consultants, Ltd., Ngnikon-Uster, Switzerland. C-Aquapour is a powdered doping material which is easily mixed with water. It may be poured or injected into molds to form complex mandrels for composite lay-up. C-Aquapour is readily soluble in tap water and can easily be washed away from the finished parts. Preferred doping materials should be able to withstand temperatures of about 350 degrees F. When dried, the doping material 49 becomes impregnated into the fiber 48 and imparts a property of stiffness to the resulting doping stiffened fiber coil 42 such that the doping stiffened fiber coil 42 can maintain its shape when used as a mandrel under compression forces applied during subsequent lay-up and curing of a co-cured carbon-epoxy structure. In the preferred embodiment, the doping stiffened fiber coil 42 should be able to withstand compression forces of up to about 100 psi or more during lay-up and up to about 15 psi vacuum during co-curing of a carbon-epoxy structure.

In a preferred embodiment, the collapsible, coiled mandrel 40 is contained within a protective liner 44 to provide a protective boundary that prevents resin during co-curing from fusing into the collapsible, coiled mandrel 40. The protective liner 44 is preferably selected from any material that provides the desired barrier properties, and may also have a property of releasing from interior surface of the carbon-epoxy structure for removal of the mandrel following curing. Preferred liner materials include elastomers, reinforced silicone rubber or synthetic rubber fluoropolymers of the type commonly used in O-rings and other molded or extruded goods.

Figure 6:
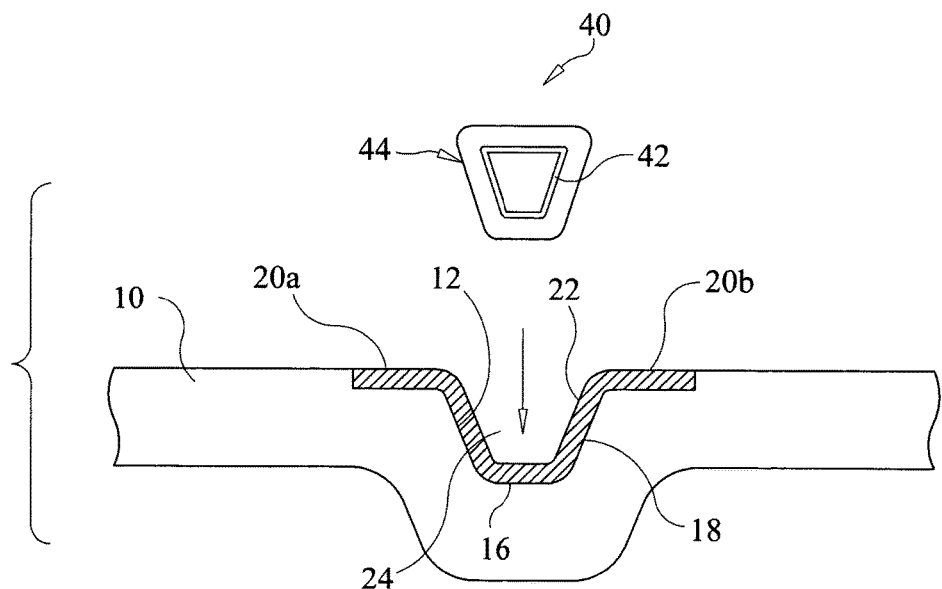
FIG. 6 is a cross-sectional end view illustrating the collapsible, coiled mandrel used in co-curing a stringer with a grooved facesheet.

As shown in FIG. 6, the collapsible, coiled mandrel 40 comprising the doping stiffened fiber coil 42 contained in the protective liner 44 may be used for forming a hat-shaped stringer 16 in aircraft construction. As described previously with respect to the conventional stringer-forming method illustrated in FIGS. 1-4, the hat-shaped stringer 16 has trapezoidal shaped side walls 18 and end flange portions 20*a*, 20*b*. The side walls 18 of the stringer 16 have interior surfaces 22 which define a hollow inner volume 24 within the hat-shaped stringer 16. The collapsible, coiled mandrel 40, fabricated with a hat-shaped cross-section for this example, is positioned within the hollow inner volume 24 of the stringer 16 so that the outer surfaces 28 of the collapsible, coiled mandrel 40 are in supporting contact with the interior surfaces 22 of the stringer 16 to maintain its shape under compressive forces applied during lay-up and curing. The collapsible, coiled mandrel 40 has an outer diameter that is substantially the same as the inner diameter of the hollow inner volume 24. After curing, the collapsible, coiled mandrel 40 is removed from the stringer 16 by pulling on the terminal end 42*a* of the collapsible, coiled mandrel 40 causing the doping material 49 to break apart and the doping stiffened fiber coil 42 to collapse in the axial direction so that it can be pulled out from the hollow inner volume 24 of the stringer 16. When collapsed, the collapsible, coiled mandrel 40 has an outer diameter that is smaller than the inner diameter of the hollow inner volume 24.

In a preferred use, the collapsible, coiled mandrel 40 is formed with a coil shape, size and coil density suitable for use as a mandrel for forming a stringer in aircraft construction. Other coil shapes, sizes and densities may be used for other applications. For example, the disclosed collapsible, coiled mandrel 40 is formed with a hat-shaped cross-section for use in manufacturing a carbon-epoxy structure having a trapezoidal or hat-shaped cross sections with a hat-shaped hollow inner volume 24. However, it will be recognized by one skilled in the art that the disclosed principles may be practiced similarly with collapsible, coiled mandrels formed with other cross-sectional shapes for use in manufacturing carbon-epoxy structures having hollow inner volumes with other cross-sectional shapes. The cross-sectional shape of the collapsible, coiled mandrel should be matched to the cross-sectional shape of the hollow inner volume of the desired carbon-epoxy structure. In addition, the compressive strength of the collapsible, coiled mandrel 40 may be increased to enable this technique to be used in other applications. More specifically, the thickness of the fiber 48 may be increased to thus increase the structural integrity of the collapsible, coiled mandrel 40 by increasing the quantity of material that is used to form the doping stiffened fiber coil 42. This could also be accomplished by reducing the space between adjacent coils in the doping stiffened fiber coil 42 so that the resultant mandrel is thicker and has a greater structural integrity and increased stiffness, etc.

Figure 7A:
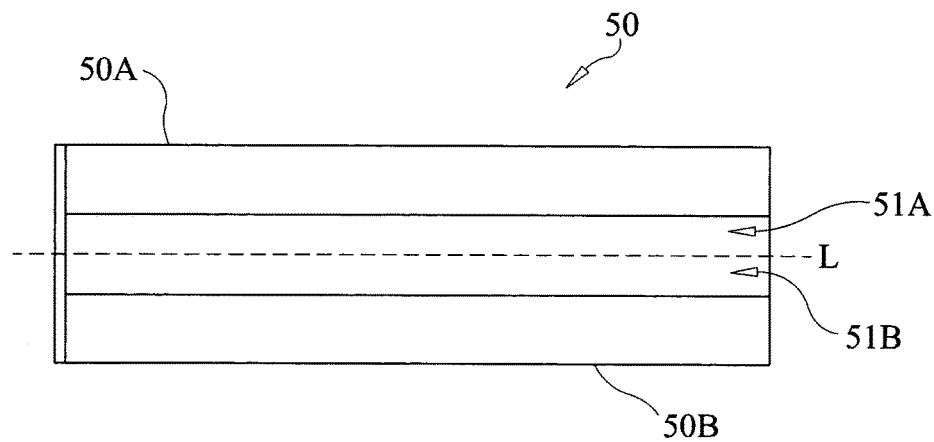
FIGS. 7A-7E are a series of views illustrating various stages of a preferred method of fabricating a collapsible, coiled mandrel.

A preferred method of fabricating the collapsible, coiled mandrel 40 is illustrated in FIGS. 7A-7E. Referring to FIG. 7A, a mold 50 for forming the collapsible, coiled mandrel 40 may comprise an upper mold half 50A and a lower mold half 50B extending in the direction of a longitudinal axis L. The mold halves 50A and 50B have mold recesses 51A and 51B and are mated together facing each other to form the combined mold recesses 51A, 51B for forming the collapsible coiled mandrel 40 therein. The mold may be fabricated from metal, wood or other types of hard materials.

Figure 7B:
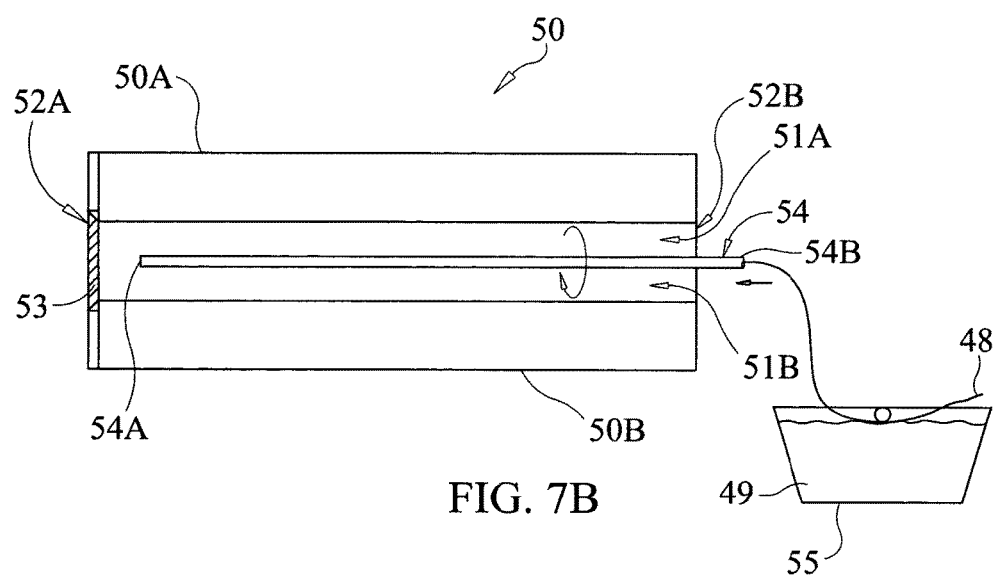

As shown in FIG. 7B, a plug 53 may be inserted as a stopper at one end 52A of the combined mold recesses 51A, 51B formed by the mated mold halves 50A, 50B of the mold 50, leaving an open end 52B at the opposite end of the combined mold recesses 51A, 51B. A long, thin tubular applicator 54 may be inserted in the open end 52B of the combined mold recesses 51A, 51B, and has an output end 54A and an input end 54B for feeding in a fiber 48 wetted with doping material 49 to form the doping stiffened fiber coil 42 in the combined mold recesses 51A, 51B. The doping material 49 may be applied to the fiber 48 by a doctor blade or from a reservoir trough 55. The fiber 48 may be fed into the applicator input end 54B by feed rollers directly from the reservoir trough 55.

Figure 7C:
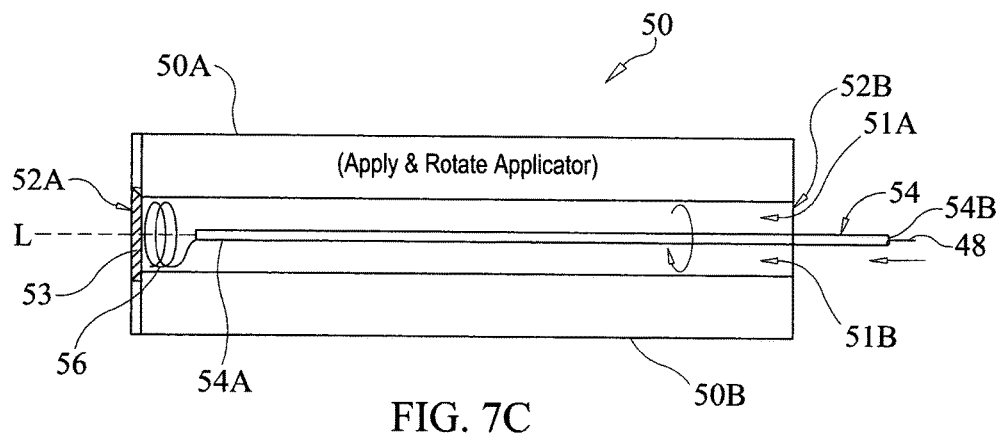

As shown in FIG. 7C, the fiber 44 wetted with the doping material 49 is fed into the input end 54B of the applicator 54 and extruded at the output end 54A of the applicator 54. The applicator output end 54A is rotated in a circular motion as the fiber 44 is extruded so that the extruded doped fiber 48 forms coil turns 56 that fill into the combined mold recesses 51A, 51B of the mold halves 50A, 50B of the mold 50, thereby taking on a hat-shaped coil cross-section matching the hat-shaped cross-section of the combined mold recesses 51A, 51B. The coil turns 56 will take on whatever shape that is provided by the combined mold recesses 51A, 51B.

The applicator 54 is backed out toward the open end 52B of the combined mold recesses 51A, 51B as its output end 54A is rotated, thereby forming a series of coil turns 56 in the direction of the longitudinal axis L. The rate of backing out the applicator 54 while rotating its output end 54A and extruding the doped fiber 48 will determine the spacing and packing density of the coils, i.e., a faster rate of backing out will result in fewer coils and a wider spacing in between, whereas a slower rate of backing out results in more coils and a tighter packing density. A preferred rate of backing out, and hence coil packing density, will depend on the desired amount of resistance to compressive forces during lay-up and co-curing. The doped fiber 48 should be fed into the applicator 54 at a constant rate to obtain the desired packing density with an even shaping of the coils.

For the formation of the coil in its resulting shape, the fed-in fiber 48 fills in and conforms to the cross-sectional shape of the combined mold recesses 51A, 51B. In a preferred embodiment, the cross-sectional shape of the combined mold recesses 51A, 51B forms a trapezoidal cross-sectional shape or hat shape to be used as a mandrel for forming a hat-shaped stringer. However, it should be understood that the cross-sectional shape of the combined mold recesses 51A, 51B can have any of a variety of sizes and shapes, and this coil formation technique can therefore be used to form a mandrel of any desired size and cross-sectional shape.

Figure 7D:
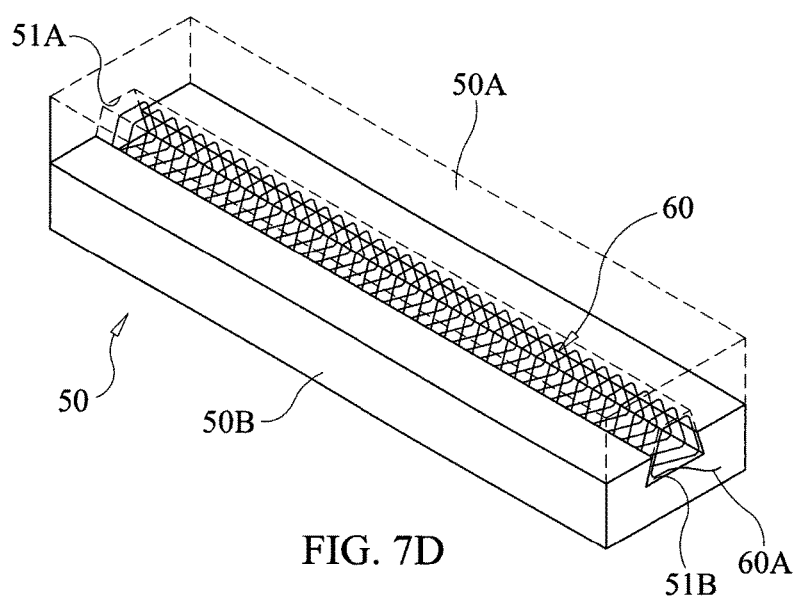
Figure 7E:
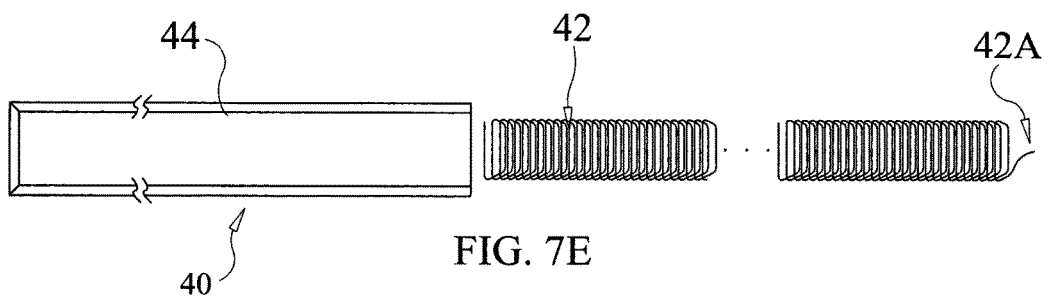

As shown in FIG. 7D, the coil formation process is continued until a complete coil 60 is formed and leaves a terminal end 60a. The complete coil 60 is then dried to form the doping stiffened fiber coil 42 and removed from the mold 50. As shown in FIG. 7E, the doping stiffened fiber coil 42 is then inserted in a tubular protective liner 44, as described above, to form the collapsible, coiled mandrel 40.

In an alternative embodiment, a collapsible, coiled mandrel 42 may be formed of a metal coil having coil turns extending along a longitudinal axis and maintaining an outer coil shape that is resistant to external compression forces during a subsequent lay-up and curing of a hollow carbon-epoxy structure. The metal coil may be preformed with a mandrel-shaped cross section or other cross-sectional shape by any of the well-known wire-forming methods, which are not described further herein. An example of a metal that may be used is steel wire capable of withstanding autoclave temperatures without degrading as well as up to about 100 psi compressive load at room temperature. The metal coil is collapsible axially when a shear force is applied that is greater than the force of resistance that maintains the metal coil in its preformed shape, so that the coiled mandrel can be easily removed by pulling on an end of the metal coil and thus collapsing the metal coil. The metal coil can be made in any of a variety of mandrel shapes.

Many modifications and variations may of course be devised given the above description of preferred embodiments for implementing the principles in the present disclosure. For example, collapsible coil mandrels of the type disclosed may be used for fabricating parts with any shape or size and in a wide range of industries. It is intended that all such modifications and variations be considered as within the spirit and scope of this disclosure, as defined in the following claims.

The invention claimed is:

1. A collapsible, coiled mandrel for use in co-curing of a hollow carbon-epoxy structure comprising:
   a coil having coil turns extending along a longitudinal axis and maintaining an outer coil shape that is resistant to external compression forces and collapsible axially by shear forces applied when an end of the coil is pulled in a direction along the longitudinal axis, the coil turns being contained within a protective liner.

2. The collapsible, coiled mandrel according to claim 1, wherein the protective liner is made of a material that allows the collapsible, coiled mandrel to release from interior surfaces of the hollow carbon-epoxy structure after curing.

3. The collapsible, coiled mandrel according to claim 1, wherein the protective liner material is an elastomer, reinforced silicone rubber, or a synthetic rubber fluoropolymer film.

4. The collapsible, coiled mandrel according to claim 1, wherein the collapsible, coiled mandrel has a coil shape, size and coil density suitable for use as a mandrel for forming a stringer in aircraft construction.

5. The collapsible, coiled mandrel according to claim 1, wherein the collapsible, coiled mandrel has a trapezoidal or hat-shaped cross-section for use in forming a hollow carbon-epoxy structure with a trapezoidal or hat-shaped cross-section.

6. The collapsible, coiled mandrel according to claim 1, wherein the coil is a metal coil.

7. The collapsible, coiled mandrel according to claim 6, wherein the metal coil is made of steel wire.

8. The collapsible, coiled mandrel according to claim 6, wherein the metal coil is preformed with a mandrel-shaped cross-section capable of withstanding up to 100 psi compressive load at room temperature.

9. The collapsible, coiled mandrel according to claim 8, wherein the metal coil is collapsible axially when a shear force is applied that is greater than a force of resistance that maintains the metal coil in the preformed mandrel-shaped cross-section.

10. The collapsible, coiled mandrel according to claim 6, wherein the protective liner is made of a material that allows the collapsible, coiled mandrel to release from interior surfaces of the hollow carbon-epoxy structure after curing.

11. A method of fabricating a collapsible, coiled mandrel, comprising:
    providing a coil having coil turns extending along a longitudinal axis and maintaining an outer coil shape that is resistant to external compression forces and collapsible axially by shear forces applied when an end of the coil is pulled in a direction along the longitudinal axis; and
    sleeving a protective liner over the coil.

12. The method of claim 11, wherein the protective liner is made of a material that allows the collapsible, coiled mandrel to release from interior surfaces of the hollow carbon-epoxy structure after curing.

13. The method of claim 11, wherein sleeving a protective liner over the coil comprises sleeving one of an elastomer, reinforced silicone rubber, or a synthetic rubber fluoropolymer film over the coil.

14. The method of claim 11, further comprising forming the coil with a coil shape, size and coil density suitable for use as a mandrel for forming a stringer in aircraft construction.

15. The method of claim 11, further comprising forming the coil with a trapezoidal or hat-shaped cross-section for use in forming a hollow carbon-epoxy structure with a trapezoidal or hat-shaped cross-section.

16. The method of claim 11, wherein providing a coil comprises providing a metal coil.

17. The method of claim 16, wherein providing a coil further comprises providing steel wire coil.

18. The method of claim 16, further comprising preforming the metal coil with a mandrel-shaped cross-section capable of withstanding up to 100 psi compressive load at room temperature.

19. The method of claim 18, wherein the metal coil is collapsible axially when a shear force is applied that is greater than a force of resistance that maintains the metal coil in the preformed mandrel-shaped cross-section.

20. The method of claim 16, wherein the protective liner is made of a material that allows the collapsible, coiled mandrel to release from interior surfaces of the hollow carbon-epoxy structure after curing.

\* \* \* \* \*